R. S. WHITNEY.
RELIEF VALVE.
APPLICATION FILED MAY 4, 1914.
1,138,338.
Patented May 4, 1915.
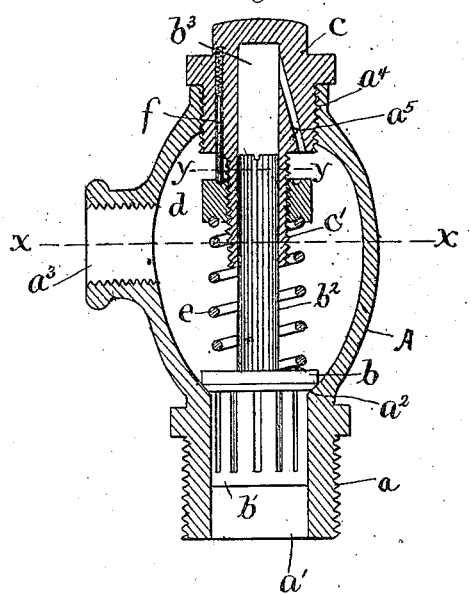
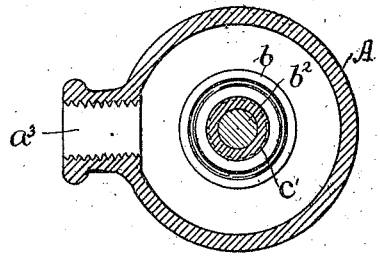
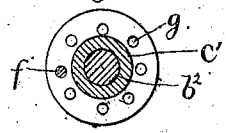
Witnesses:
Robert S. Whitney Inventor

UNITED STATES PATENT OFFICE.

ROLVIN S. WHITNEY, OF LEWISTON, MAINE.

RELIEF-VALVE.

1,138,338.   Specification of Letters Patent.   Patented May 4, 1915.

Application filed May 4, 1914. Serial No. 836,154.

*To all whom it may concern:*

Be it known that I, ROLVIN S. WHITNEY, of Lewiston, in the county of Androscoggin and State of Maine, have invented certain new and useful Improvements in Relief-Valves, of which the following is a specification.

My invention relates to relief valves designed to be used for any purpose for which such valves are used but particularly designed to be used in connection with steam traps which discharge through a relief valve.

The object of my invention is to construct a relief valve in which the valve is practically sure of being tight, and in which the tension on the valve may be accurately adjusted, the adjusting means being inside the valve and being provided with a means by which any accidental change of adjustment is prevented.

The invention consists of the combination and arrangement of parts hereinafter set forth and claimed.

My invention may best be understood by reference to the accompanying drawing, in which—

Figure 1 is a central longitudinal section through a valve constructed according to my invention, Fig. 2 is a section on the line $x$ $x$ of Fig. 1, and Fig. 3 is a section on the line $y$ $y$ of Fig. 1.

The valve is made up with the usual casing A one end being formed into a screw threaded nipple $a$ through which extends the inlet opening $a'$ which is terminated by a valve seat $a^2$. The casing is also formed with a discharge opening $a^3$ preferably at one side of the valve and at the end opposite the inlet opening there is a screw plug opening $a^4$.

A valve $b$ fits in the valve seat and it has a cylindrical guide $b'$ which extends into the inlet opening and is in contact with the walls thereof. The guide $b'$ is provided with slots which allow of the free passage of steam or other fluid.

In the end of the casing opposite to the valve $b$ is a screw plug $c$ fitting in the opening $a^4$ and provided at its inner end with a screw threaded extension $c'$ upon which is an adjusting nut $d$. A central opening $b^3$ extends from the inner end of the extension $c'$ into the screw plug and in this opening fits the valve spindle $b^2$ connected with the valve $b$.

Interposed between the nut $d'$ and the valve is the tension spring $e$, the tension of which is adjusted by screwing the nut out or in on the screw threaded extension $c'$.

Means are provided for preventing the adjusting screw from accidentally turning and thus changing the tension of the spring. As here shown I provide a pin or detent $f$ which is contained in a hole bored in the plug parallel with the axis of the spindle. It is forced inwardly by a spiral spring and it has a rounded inner end which snaps into one of the series of shallow recesses $g$ formed on the surface of the nut $d$. These recesses are arranged in a ring about the nut and at sufficiently close intervals so that the spring $e$ may be adjusted with sufficient accuracy while the detent engages one of the recesses $g$.

To relieve the steam pressure which would otherwise force the spindle $b^2$ into the recess $b^3$ I provide a duct $a^5$ which connects the interior of the valve with the recess $b^3$. The steam entering through the duct $a^5$ counteracts the pressure on the lower portion of the spindle $b^2$. The opening $a^4$ is slightly larger than the valve $b$ so that the valve and all of its connections may be taken out through the end of the casing.

It will be seen that a relief valve constructed in accordance with my invention may be accurately set to open at any desired pressure within fixed limits and when the adjusting nut is once set it cannot be tampered with or moved accidentally since the detent keeps it from turning except when a considerable pressure is applied. When it is desired to remove the parts of the valve for any purpose the plug $c$ is unscrewed and the valve, spring, nut, etc., come out through the opening $a^4$.

I claim :—

In a relief valve, the combination of a casing having formed therein an inlet opening, a valve seat adjacent to said opening, a discharge opening, and a screw plug opening, a valve fitting said valve seat having guides extending into the inlet opening and guided by the walls thereof, a screw plug fitting said screw plug opening, said plug having a screw threaded extension and a central spindle opening extending partially through the plug, a valve spindle on said valve extending into said spindle opening, an adjusting nut on said extension having a series of shallow cavities, a spring pressed detent in said plug having a rounded end adapted to snap into and out of said cavities and a spiral spring interposed between said nut and said valve.

In testimony whereof I have affixed my signature in presence of two witnesses.

ROLVIN S. WHITNEY.

Witnesses:
EMERY P. DAVIS,
CHARLES E. DARLING.